United States Patent [19]

Remnant

[11] Patent Number: 5,787,835
[45] Date of Patent: Aug. 4, 1998

[54] WAKE ENHANCING STRUCTURE

[75] Inventor: Wayne Remnant, Toronto, Canada

[73] Assignee: Isotech, Inc., Johnson City, Tenn.

[21] Appl. No.: 807,877

[22] Filed: Feb. 26, 1997

[51] Int. Cl.⁶ .................................................. B63B 1/00
[52] U.S. Cl. ........................ 114/271; 114/343; 114/125;
383/3; 383/109; 383/111; 383/113
[58] Field of Search ........................ 114/256, 123,
114/125, 121, 343, 364, 271; 383/3, 109,
111, 113; 220/562, 403, 905; 224/148.1–148.5;
43/56, 57

[56] References Cited

U.S. PATENT DOCUMENTS

| 3,385,251 | 5/1968 | Grocott | 114/125 |
|---|---|---|---|
| 3,628,204 | 12/1971 | Hoffman, Jr. | 114/343 |
| 4,136,725 | 1/1979 | Phillips et al. | 220/562 |
| 4,193,518 | 3/1980 | Holmes | 224/148.2 |
| 4,420,097 | 12/1983 | Motsenbocker | 224/148.2 |
| 4,815,411 | 3/1989 | Burgess | 114/255 |
| 5,050,526 | 9/1991 | Nelson et al. | 114/364 |
| 5,199,793 | 4/1993 | Jackson | 220/905 |

OTHER PUBLICATIONS

Johnson Super Sea Horse 55 HP Owner's Manual, 1969.

*Primary Examiner*—Ed L. Swinehart
*Attorney, Agent, or Firm*—Watson Cole Grindle Watson, P.L.L.C.

[57] ABSTRACT

A light-weight, portable container is provided for the stern of a boat in order to add weight to the stern and enhance the wake of the boat. The container is formed from an outer bag resistant to abrasion and puncture and an inner, liquid impermeable bladder positioned within the bag and protected from puncture and abrasion by the bag. The bladder is filled with water through one or more nozzles accessed through openings in the bag.

12 Claims, 3 Drawing Sheets

U.S. Patent        Aug. 4, 1998        Sheet 1 of 3        5,787,835
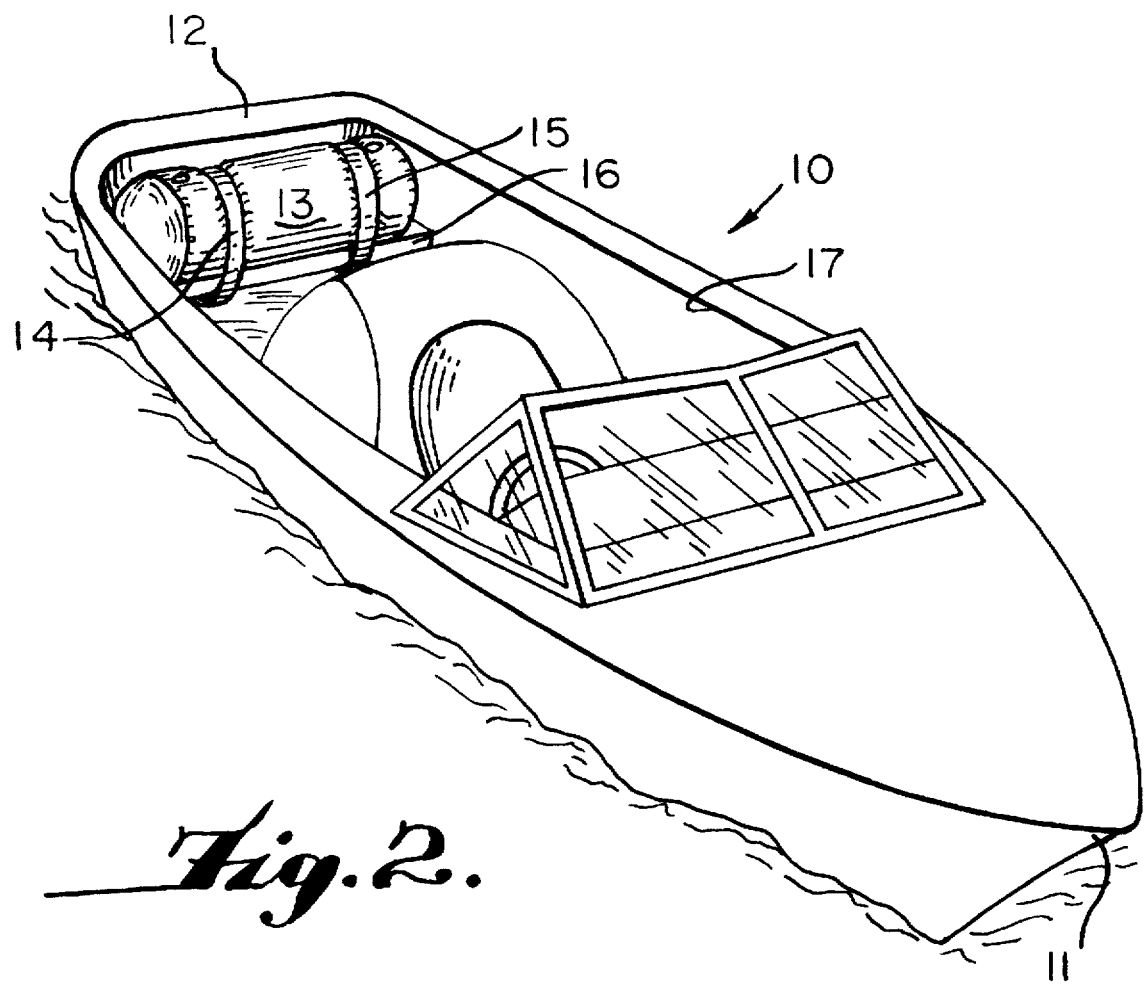
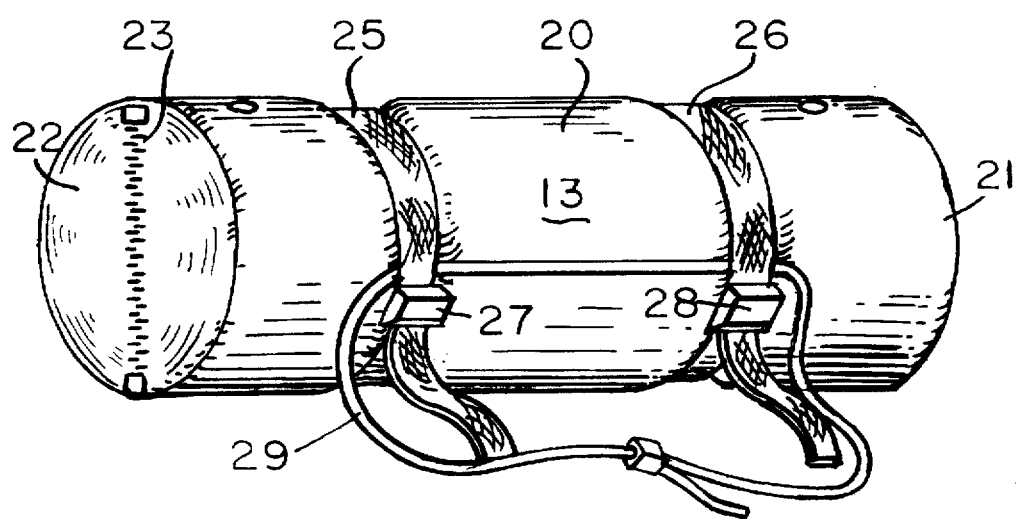

WAKE ENHANCING STRUCTURE

I. FIELD OF THE INVENTION

The present invention relates generally to structures having substantial weight placed in a boat in order to improve the performance, stability, or some other feature of the boat. More particularly, this invention is directed to a device having sufficient weight to substantially increase the wake imparted to water aft of a boat as it progresses through a body of water, so that a greater degree of turbulence will be achieved in such wake than that generated by the boat per se.

II. BACKGROUND OF THE INVENTION

It has long been considered advantageous to provide weights for vessels in order to improve the performance of the vessels sunder various conditions. For example, ballast has been added to the hulls of vessels in order to maintain the ship at a lower water line and to concentrate the weight of the vessel well below the water line of the ship. In this manners in rough seas the weight of the ballast will go far toward preventing the ship from capsizing, which was particularly true when the ship was a man-o-war that had heavy artillery pieces located on one or more decks above the water line. In the latter instance, during rough seas a sudden shift of the artillery from port to starboard or vice versa might well and did result in capsizing.

More recently, it has become a water sport to water ski or water board behind a boat as the boat moves through a body of water. The challenge of the sport is increased when the wake behind the stern of the boat has acquired a severe degree of turbulence, thereby presenting an opportunity for an enthusiast to leap the wake and pass from one side of the boat to the other, while maintaining a position well behind the boat. Indeed, acrobatic maneuvers may be performed when the wake is of sufficient turbulence, such as performing a 90° or 180° turn while leaping the wake, and performing other stunts that may be judged at tournaments and other contests.

As a consequence, to those afficionados of water skiing and water boarding sports, it is imperative that a boat develop a turbulent wake as the boat moves along a body of water. While to an extent the speed of the boat relates to the turbulence of the wake, there is obviously a limit to the speed that may be safely maintained; therefore, there is a practical limit to the wake that will be generated by any boat moving at cruising speed. In order to increase the turbulence of the wake, weights can be added at the stern of the boat, thereby depressing the stern in the water, moving the screw of the boat lower in the water, and thereby increasing the turbulence of the wake.

However, adding several hundred pounds of cement blocks to the stern of the boat has been found to be highly unsatisfactory, if for no other reason than that the blocks may be dropped while being positioned, thereby causing severe damage to the boat structure. Further, cement blocks should be removed after any water sport has been completed, thereby increasing the likelihood that an accident will occur during installation or removal of the blocks. Moreover, if the boat is moving at a rapid clip and makes a turn, the blocks may tend to shift from their position at the stern toward one side of the boat or the other, thereby presenting a real hazard to continued maintenance of the safety of the boat as it speeds through the water.

It is, therefore, recognized that it would be highly advantageous, and it is a primary object of the present invention to provide a weight enhancing structure that is easily portable and may be placed at the stern of a boat, which device may then have weight added to it. After the sporting trip has been completed, such weight can then be divested from the device, which can be stored aboard or easily removed from the boat itself.

It is another object of my invention to provide a portable, light-weight container that may be temporarily installed at the stern of the boat, filled with water or other liquid in order to add weight to the stern of the boat, and which, then, after the water sport activity has been concluded, can be easily divested of liquid and the concomitant weight thereof, and either removed from the boat without fear of damage to the boat or stored onboard for use during the next sporting trip.

III. SUMMARY OF THE INVENTION

The present invention takes the form of both a light-weight, portable container for location in a boat for enhancing the turbulence of the wake of the boat, and the combination of the boat and such a container. With regard to the container structure, it includes an outer bag having resistance to abrasion and puncture, but also having some permeability to the passage of liquid therethrough. Within that bag is a liquid impermeable bladder that is protected from puncture and abrasion by the bag. In order to provide ingress and egress to the bladder, at least one nozzle is formed in the bladder in a surface area thereof. Means on the bag permits the bladder nozzle to be accessed while the bladder is within the bag so that liquid may be added to or removed from the bladder without removing the bladder from the bag. That means may, for example, be an opening in the bag adjacent the bladder nozzle, which opening is open and closed by means of a zipper or other, similar means. In a preferred embodiment, there will be two such bladder nozzles.

According to one feature of my invention, the bag is substantially cylindrical in form, and there is an opening at one end of the cylinder that enables the bladder to be inserted within the bag and removed therefrom. That opening is maintained in closed position by fastening means, such as a zipper. Another feature of my invention is that the bladder is expandable as i=is filled with liquid, but that the bladder has a dimension as expanded that exceeds a corresponding dimension of the bag within which the bladder is disposed. Since the bladder expands as it is being filled with liquid, the bladder dimension will press on the bag portion that has a lesser dimension. In this manner the weight of the liquid will be significantly supported by the outer bag, which is of necessity stronger than the inner bladder; thus, the bladder will not be subjected to undue stress as it is filled with a substantial amount of liquid.

The container as above summarized also forms an Invention in combination with a boat in which it is located. It is advantageous that the container be located at the stern of the boat, which can easily be accomplished due to the portability and lightness of weight of the container when it is empty. However, when liquid is placed within the container, the weight of the container is substantially increased, and it thereby depresses the boat's stern as the boat advances along the surface of a body of water so that the boat leaves a wake behind it of substantially greater turbulence than the weight generated by the boat without the liquid and container. It has been found preferable that the container be attached to the boat at its stern, and that such attachment be removable, so that the container will remain in place at the stern of the boat during a sporting trip, but be releasably removable from the stern at the end of the trip.

It is presently preferred that the container be substantially cylindrical in form and that holding means be one or more straps that encircle the container and hold it in place on part of the boat structure. Such straps may be released once the trip has ended, and the liquid within the container drained or otherwise removed therefrom.

These and other objects, features, and advantages of my invention will become more important when considered in connection with a detailed description of a preferred embodiment of my invention and in connection with the drawings of such preferred embodiment, which drawings form a part hereof and in which:

FIG. 1 is a perspective view showing the general combination a of a boat and container held therein;

FIG. 2 is a perspective view of a container according to my invention as removed from the boat;

IV. DETAILED DESCRIPTION

Figure 3:
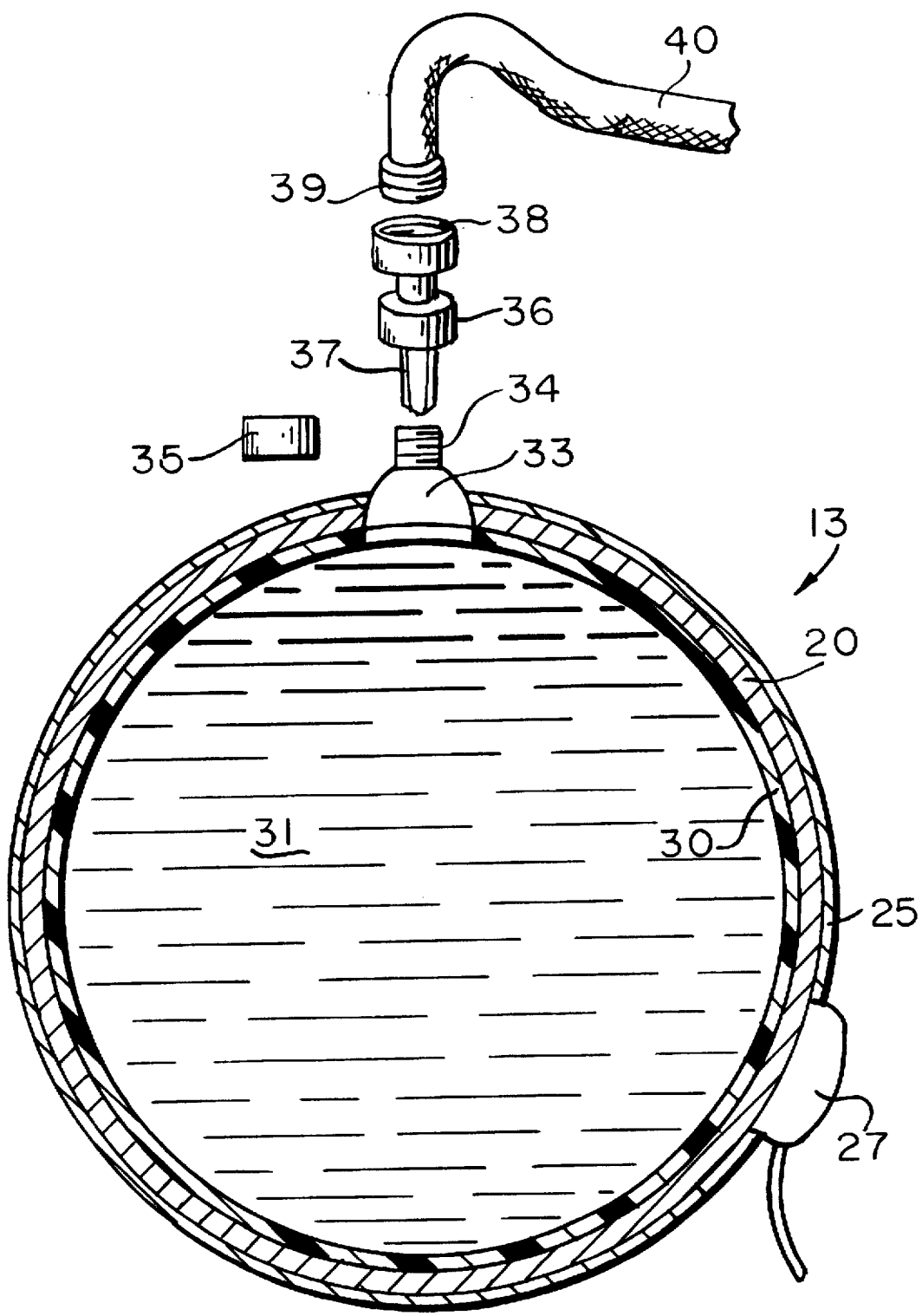
FIG. 3 is a vertical sectional view, greatly enlarged, through the container of FIG. 2, further showing fittings and nozzle by means of which the container may be filled with liquid.

Referring now to the drawings, and in particular to FIG. 1 thereof, the present invention contemplates a boat, illustrated generally by reference numeral 10, which is suitable for water skiing, wake boarding, and similar water sports. The boat 10 has a bow 11 and stern 12 in the normal manner of a boat. As illustrated, the boat engine is either inboard or inboard/outboard, although, of course, an outboard motor may also be utilized. Shown mounted at the stern of the boat is a container, referenced generally by numeral 13, which is held by straps 14 and 15 to a platform 16 firmly fixed to the boat hull 17.

A presently preferred embodiment of the container of my invention is illustrated in FIGS. 2 and 3 of the drawings. With respect to the exterior of the container, as shown in FIG. 2, the container is in generally cylindrical form. What is seen is an outer bag 20, which has the overall cylindrical shape, which cylinder terminates in opposed ends 21 and 22. Illustrated in cylinder bag end 22 is a zipper 23 which provides access to the interior of the bag. Also there illustrated are straps 14 and 15, which encircle the circumference of the container 13 at spaced locations along the length of the container. Straps 14 and 15 are maintained in position or released by buckles 27 and 28, and a halter 29 that extends beneath straps 14 and 15 is provided so that when it is desired to move container 13, provided that there is not an excessive weight of liquid within the container, such may be performed by grasping halter 29 and thereby lifting the entirety of the container 13.

FIG. 3 is a vertical sectional view taken through the cylindrical container 13 in a plane parallel to the cylinder ends 21 and 22, and through a nozzle for filling or removing liquid from container 13. As illustrated, the container is formed from an inner bladder 30 which is illustrated as being filled with liquid, e.g., water 31. The bladder is surrounded by bag 20. Also illustrated is a strap 14 and its associated buckle 27. Shown at the top of the container in FIG. 3 is a nozzle 33 formed in bladder 30 and extending outwardly therefrom through an opening in the bag 20. The nozzle 33 terminates outwardly in a threaded cylinder 34 that can either be sealed against the passage of liquid by a closure 35 or, when the closure 35 has been removed, may be used with an adapter 36 having projection 37 that extends within the orifice of nozzle 33. In such position the threaded portion 38 of adapter 36 may receive mating threaded portion 39 of hose 40 in the normal manner such that, when it is desired to fill the container 13 with liquid, e.g., water, the hose 40 may be attached to a faucet and will accomplish that purpose.

Figure 4:
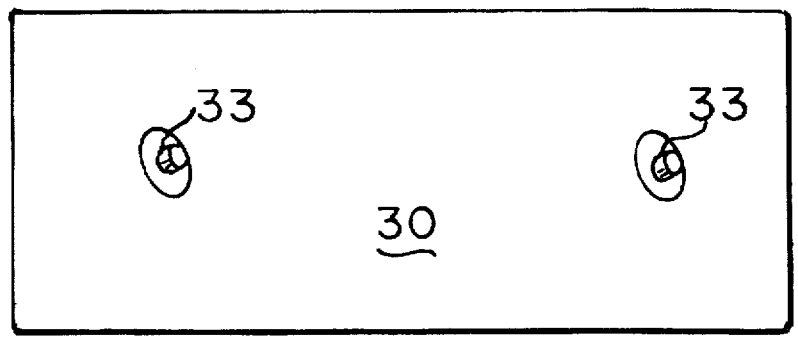
FIG. 4 is a plan view of a bladder that forms part of the container of the invention.
Figure 5:
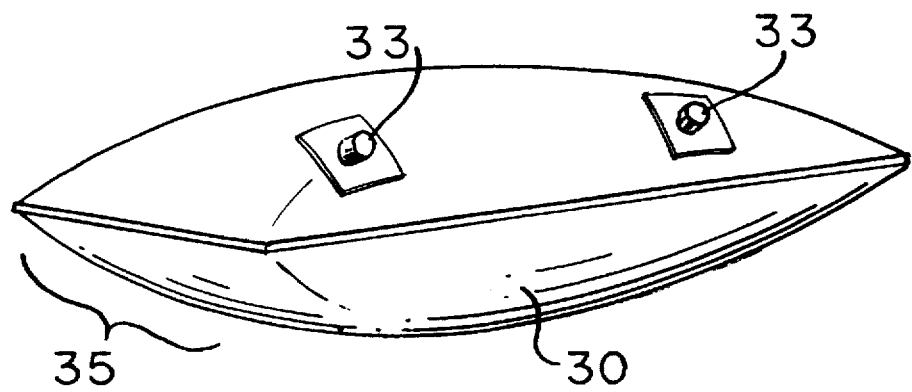
FIG. 5 is a perspective view of a different embodiment of that bladder as partially filled with liquid.

One feature of my invention is the bladder 30 that is best seen in FIGS. 4 and 5 of the drawings. It will there be seen that the bladder, which is formed from a water impermeable material, e.g., natural or synthetic rubber, or a soft, resilient plastic, such as a vinyl polymer, has, in its preferred embodiment, two nozzles therein. Those nozzles extend in the manner shown in FIG. 3 through the outer bag 20 of container 13, which bag has a zipper so that when the nozzle is depressed, it will not extend through the outer bag surface. As seen in FIG. 5, for example, the shape of the bladder 30 need not be directly cylindrical, but will have at least one dimension that is greater than the inside dimension of the bag 20. As shown in FIG. 5, that dimension may be the width of the bladder 30, which width it is shown by reference numeral 35. Since the width is greater than the diameter of the cylindrical bag, when the inner bladder 30 is fully or at least partially filled with water, the width of the bladder will press against the sides of the bag 30 and, in this manner, the bag 30, which is the stronger of the two, will lend a primary supporting function to the liquid 31 within the bladder. The prime function of the bladder is to be inflated by liquid and to be impermeable to the passage of that liquid through the bladder. Thus, the bag, which may be formed of nylon mesh or some other material resistant to puncture and abrasion, will act to protect the bladder and, in addition, will support or aid in the support of the liquid within the bladder, since such liquid will have considerable weight and would exert a rupturing stress on the bladder were that material to be the sole support for the liquid therewithin.

In its presently proposed best mode, my invention is in the form of a cylinder of which, when filled with water, is 48 inches long and 18 inches in diameter. It is a light-weight, portable system designed specifically to meet the demands of a serious wake boarder. While its primary use is to increase the turbulence of the wake of the boat and therefore, is normally mounted at the stern of the boat, it can be used in the bow of a stern drive I/O boat to help keep the bow down at slower speeds. In accordance with the dimensions set forth as most preferred, it can be filled with water in 3 to 10 minutes with an electric pump or with a garden hose.

When it is desired to utilize the present invention to increase the turbulence of a boat wake, the empty container 13 is first located in position an boat platform 16. As so located, a nozzle 33 is permitted to extend beyond the outer surface of the cylindrical bag 20 and closure member 35 is removed from the threaded cylinder 34 of nozzle 33. Then adapter 36 is placed with its shaft 37 within nozzle 33 and threaded coupling 39 mated with internally threaded coupling 38 with which adapter 36 terminates. Then, in one embodiment, water from a garden hose 40 is permitted to flow through the nozzle 33 and into the interior of the container 13 until the water fills the bladder 30 substantially as shown in FIG. 3. When a sufficient amount of water has been located within container 30, the adapter 36 is removed along with hose 40 and closure member 35 is screwed onto threaded extension 34 of the nozzle. If desired, then, the nozzle can be depressed in a well known manner such that it lies entirely within the periphery of the bag 20 and does not extend therebeyond. This can be accomplished by attaching the closure 35 to nozzle extension 34 and then exerting a downward pressure on nozzle 33 until the closure 35 is below the bag surface 20, and then zipping up the opening in the bag to retain the closure 35 and nozzle 33 interior of the bag 20.

When it is desired to empty the container to remove the water 31 therefrom, hose 40 having a free end can be reattached in the same manner using the adapter 36, the container rotated, and water can then be permitted to drain through the hose 40 over the side of the boat or, if more convenient, into the bilge of the boat for ultimate discharge therefrom. After the water 31 has been drained from the container 13, the adapter 36 and hose 40 may be removed, the closure 35 reinserted on nozzle 33 and the bag 20 and bladder 30, which are now pliable and unextended, can simply be folded or rolled into a compact form and stored either in an onboard locker or at a location remote from the boat. In this manner the container of my invention has proved to be portable and effective for increasing the turbulence of the wake of a boat, yet relatively inexpensive and not subject to accidental rupture due to mishandling.

While the present invention has been described with respect to a preferred embodiment thereof, it will be recognized by those of skill in the art that various modifications and alterations of that preferred embodiment and of the invention as described hereinbefore will be obvious to those of such skill. As to all such modifications and alterations of the invention, it is desired that they be included within the scope of my invention, which is to be limited only by the purview, including equivalents, of the following, appended claims.

What is claimed is:

1. The combination of a boat having mounted therein an engine of sufficient thrust to create a wake of turbulent water at the stern of the boat as the boat moves along the surface of a body of water, a light-weight, portable container located at said boat stern, and a liquid, water within said container, said liquid in said container having a weight sufficient to depress said boat stern as said boat advances along the surface of said body of water so that said boat leaves a wake behind it of substantially greater turbulence than the wake generated by said boat without said liquid.

2. The combination claimed in claim 1, in which said container is attached to said boat at the stern thereof.

3. The combination claimed in claim 2, in which said container is removably attached to said boat.

4. The combination claimed in claim 1, in which said container is substantially cylindrical in shape, and wherein there is holding means that encircles said container and holds said container to said boat.

5. The combination claimed in claim 4, in which said holding means is in the form of at least one strap having releasable means for holding said container to said boat.

6. The combination of a boat having mounted thereon an engine of sufficient thrust to create a wake of turbulent water at the stern of, the boat as the boat moves along the surface of a body of water, and a light-weight, portable container located in said boat, said container comprising:

a bag having resistance to abrasion and puncture but also having some permeability to the passage of liquid there through, a liquid-impermeable bladder positioned within said bag and as so positioned, being protected by said bag from puncture and abrasion, said bladder having at least one nozzle formed in a surface area thereof through which liquid may be supplied to or removed from said bladder, and means on said bag to permit said at least one bladder nozzle to be accessed while said bladder is within said bag so that liquid may be added to or removed from said bladder without removing said bladder from said bag, said liquid in said container having a weight sufficient to depress said boat stern as said boat moves along said surface of said body of water so that said boat leaves a wake behind it of substantially greater turbulence than the wake generated by said boat without said liquid.

7. The combination claimed in claim 6, wherein there are two bladder nozzles.

8. The combination claimed in claim 6, further comprising means enabling said bladder to be located within and removed from said bag.

9. The combination claimed in claim 8, wherein said bag is substantially cylindrical in form and said enabling means is a slit at one end of said cylinder, said slit being maintained in closed position by fastening means.

10. The combination claimed in claim 6, wherein said bladder is expandable as it is filled with liquid.

11. The combination claimed in claim 10, wherein said bladder has at least one dimension larger than a corresponding dimension of said bag, so that as said bladder is filled with liquid and said bladder expands, said bladder at said dimension will be supported by said corresponding, lesser dimension of said bag rather than said bladder alone.

12. The combination of a boat having mounted therein an engine of sufficient thrust to create a wake of turbulent water at the stern of the boat as the boat moves along the surface of a body of water, comprising:

a light-weight, portable container releasably attached to the interior of said boat at the stern thereof, said container including a nylon mesh bag having considerable strength and resistance to abrasion and puncture, and an inflatable, waterproof bladder positioned within said bag and as so positioned being protected by said bag from puncture and abrasion, said bladder having at least one nozzle through which liquid may be supplied to or emptied from said bladder, said bladder having at least one dimension greater than a corresponding dimension of said bag so that as said bladder is filled with liquid and said bladder expands, said bladder at said dimension will be supported by said corresponding, lesser dimension of said bag rather than by said bladder alone to reduce the rupture stress on said bladder, said bladder having at least one nozzle formed therein through which liquid may be supplied to or removed form said supported bladder, and means on said bag to permit said at least one bladder nozzle to be accessed while said bladder is within said bag so that liquid may be added to and emptied from said bladder without removing said bladder from said bag, and liquid located within said container, said liquid in said container having a weight sufficient to depress said boat stern as said boat advances along the surface of said body of water so that said boat leaves behind it a wake of substantially greater turbulence than the wake generated by said boat without the weight of said liquid.

* * * * *